United States Patent [19]

Dicker et al.

[11] Patent Number: 5,219,945
[45] Date of Patent: Jun. 15, 1993

[54] ABC TRIBLOCK METHACRYLATE POLYMERS

[75] Inventors: Ira B. Dicker, Wilmington, Del.; Walter R. Hertler, Kennett Square; Sheau-Hwa Ma, Chadds Ford, both of Pa.

[73] Assignee: E. I. Du Pont de Nemours and Company, Wilmington, Del.

[21] Appl. No.: 838,165

[22] Filed: Feb. 20, 1992

[51] Int. Cl.$^5$ ............... C08F 259/08; C08F 265/06; C08F 297/02

[52] U.S. Cl. ............... 525/276; 525/271; 525/284; 525/288; 525/294; 525/299; 525/301; 525/302; 525/304; 525/305; 525/308; 525/309; 525/312; 525/313; 525/314

[58] Field of Search ............... 525/250, 271, 276, 284, 525/286, 288, 293, 294, 296, 299, 301, 302, 304, 305, 308, 309, 312, 313, 314

[56] References Cited

U.S. PATENT DOCUMENTS

| | | | |
|---|---|---|---|
| 3,287,298 | 11/1966 | D'Alelio | 525/293 |
| 3,891,721 | 6/1975 | Prudence | 260/879 |
| 4,417,034 | 11/1983 | Webster | 526/190 |

FOREIGN PATENT DOCUMENTS

| | | | |
|---|---|---|---|
| L189767 | 4/1970 | Canada. | |
| 0408429 | 1/1991 | European Pat. Off. | 525/271 |
| WO9100874 | 1/1991 | World Int. Prop. O.. | |

OTHER PUBLICATIONS

Sogah et al., *Macromolecules* 1987, 20, 1473.
Reiss et al., *Macromol. Sci. Phys.* 1980, B17, 335.
Fielding-Russell et al., *Polymer* 1977 18, 859.
Ohnuma et al., *Bull. Inst. Chem. Res.*, Kyoto Univ. 1988, 66(3), 283-296.
Comeau et al., *Nucl. Med. Biol.* 1990, 321-329.
Webster et al., *J. Amer. Chem. Soc.* 1983, 105, 5706.
Sdranis, *Macromolecules* 1991, 24, 1341.
Li et al. *Makromol. Chem., Macromol. Symp.* 1990, 33, 253.
Lelah et al., *Polymer J.* 1985, 17, 841.
Malhotra et al., *Eur. Poly. J.*, 22, 5, 391-397, 1986.
Kudose et al., *Macromolecules* 1984, 17, 2325.
Matsushita et al., *Macromolecules* 1983, 16, 10.
Funabashi et al., *Macromolecules* 1983, 16, 1.
Shibayama et al., *Macromolecules* 1982, 15, 274.
Watanabe et al., *Polymer J.* 1981, 13, 149.
Arai et al., *Macromolecules* 1980, 13, 1670.
Hsieh, *J. Appl. Polym. Sci.* 1978, 22, 1119.
Luxton et al., *Polymer* 1978, 19, 1320.
Cunningham, *J. Appl. Polym. Sci.* 1978, 22, 2387.
Koetsier et al., *J. Polym. Sci., Polym. Chem. Ed.* 1978, 16, 511.
Fetters et al., *Macromolecules* 1977, 10, 1200.
Fielding-Russell et al., *Polymer* 1974, 15, 97.
Cooper et al., *Polymer* 1974, 14, 175.
Price et al., *Polymer* 1974, 15, 541.
Matsushita, et al., *Macromolecules*, 1980, 13, 1053.
Arai et al., *Macromolecules*, 1980, 13, 455.

Primary Examiner—Jacob Ziegler

[57] ABSTRACT

This application discloses linear methacrylic ABC triblock polymers in which the composition of each of the three blocks is different and wherein at least one of the blocks is hydrophobic and at least one of the blocks is hydrophilic.

19 Claims, No Drawings

ABC TRIBLOCK METHACRYLATE POLYMERS

BACKGROUND OF THE INVENTION

This application discloses a linear methacrylic ABC triblock polymer, having at least one hydrophobic block and one hydrophilic block, in which the composition of each of the three blocks is different.

A variety of ABC triblock polymers, in which the chemical constitution of each polymeric block differs from the other two, have been described in the literature. Generally, they have been prepared by anionic polymerization. The ABC triblock polymers of the art have been found to be useful as elastomeric materials, for example in design of automobile bumpers. Some of these ABC triblock polymers contain a hydrophilic block but, of these, none are prepared exclusively with methacrylates.

Int. Application No. PCT/Fr90/00514, published on Jan. 24, 1991 as WO 91/00874 (same as European Patent Application EP 408429, Jan. 16, 1991), discloses triblock ABC copolymers wherein A and C can be an acrylic, vinyl aromatic, methacrylic, or maleimide block, where B is an acrylic, vinyl aromatic or methacrylic block, and where at least one of A and C is selected from a different class from that of the B block. Thus, all three blocks cannot be methacrylic.

U.S. Pat. No. 4,417,034, which is incorporated herein by reference, covers the GTP process of preparing block polymers generically; the composition claim is to "living" (silyl ketene acetal-ended) polymers, not the "quenched" block polymers of this invention.

D. Y. Sogah, W. R. Hertler, O. W. Webster, G. M. Cohen, *Macromolecules* 1987, 20, 1473 discloses an ABC triblock polymer (without a hydrophilic block), poly(methyl methacrylate-b-butyl methacrylate-b-allyl methacrylate).

G. Reiss, M. Schlienger, S. Marti, *J. Macromol. Sci.-Phys.* 1980, B17, 355 discloses a ternary blend of two homopolymers, poly(styrene) and poly(methyl methacrylate) and an ABC triblock polymer, poly(styrene-b-isoprene-b-methyl methacrylate).

G. S. Fielding-Russell, P. S. Pillai, *Polymer* 1977, 18, 859 discloses an ABC triblock polymer with a hydrophilic block, poly(styrene-b-butadiene-b-2-vinyl pyridine hydrochloride).

H. Ohnuma; T. Shimohira; H. Tanisugi; I. Kudose; T. Kotaka *Bull. Inst. Chem. Res., Kyoto Univ.* 1988, 66 (3), 283-296. Morphological studies of ABC triblock butadiene-styrene-4-vinylpyridine and quaternized polymers.

R. Comeau et al., *Nucl. Med. Biol.* 1990, 321-329 describe "Conjugation of a Monoclonal Antibody with a DTPA Modified Random Copolymer of Hydroxyethyl Methylacrylate and Methyl Methacrylate".

SUMMARY OF THE INVENTION

Linear methacrylic ABC triblock polymers in which the composition of each of the three blocks is different and which has at least one hydrophophilic block and at least one hydrophobic block are disclosed. Preferably, the "B" block of the methacrylic ABC triblock polymer does not contain a significant amount of the components of the "A" and "C" blocks. Each block may, optionally, contain a low level of one or more monomers that have a specific type of functional group, e.g. acid or base. These optional functional groups may differ from the functional groups on the block.

An example of the methacrylic ABC triblock polymer disclosed is where the A and C blocks are hydrophilic and the B block is hydrophobic or where the B block is hydrophilic and the A and C blocks are hydrophobic. Another is where two or all three of the blocks are mutually immiscible. The ABC polymers of the present invention may be produced by sequential polymerization of three different methacrylates or combinations of methacrylates using a living polymerization method such as anionic polymerization or group transfer polymerization.

DETAILED DESCRIPTION OF THE INVENTION

Group transfer polymerization of acrylic monomers is a particularly useful method for producing ABC triblock polymers, especially from methacrylates. Although anionic polymerization can also be used to prepare ABC triblock polymers of methacrylates, the extremely low temperature constraints render the anionic process less attractive commercially than group transfer polymerization (GTP). Also, certain functional groups tolerated by GTP methodology are not tolerated during anionic polymerization, for example, but not limited to, primary and/or secondary amines, epoxides and alkyl halides. Anionic polymerization methods are described in M. Morton, Anionic Polymerization; Principles and Practices, Academic Press, N.Y., 1983 and J. E. McGrath, Ed., "Anionic Polymerization: Kinetics, Mechanism and Synthesis", American Chemical Society, Washington, D.C., 1981, ACS Symposium Series No. 166.

Each of the A, B, and C blocks of the triblock polymers of the invention must contain at least three units of monomer and each of the blocks may be a linear methacrylic homopolymer or linear methacrylic random copolymer. Each block can contain from 3 to 90 weight percent of the total polymer weight.

The unique and useful properties of ABC triblock polymers described herein are achieved when the three blocks are dissimilar in nature. It is particularly important that the B (center) block differ from the A and C (end) blocks in properties, such as hydrophilicity, stiffness, glass transition temperature, or polarity. Thus, while the B block may be a methacrylic copolymer, it must not contain significant amounts of the monomer components of both the A and C blocks. In many of the ABC triblock polymers of the Examples, property differences of the blocks can be enhanced by, for example, conversion of a methacrylic acid block to the corresponding alkali metal salt, or conversion of a dimethylaminoethyl methacrylate block to the corresponding hydrochloride or hydrogen phosphate salt. Examples of triblock polymers that can be converted to alkali metal salts are poly(methacrylic acid-b-2-phenylethyl methacrylate-b-n-butyl methacrylate), poly(methacrylic acid-b-2-phenylethyl methacrylate-b-ethoxytriethylene glycol methacrylate), poly(methacrylic acid-b-2-phenylethyl methacrylate-b-methoxypolyethylene glycol methacrylate) and poly(methacrylic acid-co-methyl methacrylate-b-2-phenylethyl methacrylate-b-ethoxytriethylene glycol methacrylate), poly-ω-2-β-hydroxyethyl isobutyrate(methoxypolyethylene glycol 400 methacrylate)-b-2-phenylethyl methacrylate-b-ethoxytriethylene glycol methacrylate), poly(methacrylic acid-b-2-phenylethyl methacrylate-b-2-hydroxyethyl methacrylate), poly(methacrylic acid-b-2-phenylethyl methacrylate-b-2-ethoxyethyl methacrylate), poly(methacrylic acid-b-benzyl methacrylate-co-methyl methacrylate-b-ethoxytriethylene glycol methacrylate), and poly(methacrylic acid-b-benzyl methacrylate-b-ethoxytriethylene glycol methacrylate).

Poly(2-dimethylaminoethyl methacrylate-co-methyl methacrylate-b-2-phenylethyl methacrylate-b-ethoxytriethylene glycol methacrylate), poly(2-dimethylaminoethyl methacrylate-co-methyl methacrylate-b-2-phenylethyl methacrylate-co-methacrylic acid-b-ethoxytriethylene glycol methacrylate) and poly(2-dimethylaminoethyl methacrylate-b-2-phenylethyl methacrylate-b-ethoxytriethylene glycol methacrylate) can be converted to their salts with a mineral acid.

Additional examples of monomers which may be used to construct ABC triblock polymers of the invention are methyl methacrylate, ethyl methacrylate, 2-ethylhexyl methacrylate, isobornyl methacrylate, benzyl methacrylate, 1-ethoxy-1-propyl methacrylate, glycidyl methacrylate, 2-trimethylsilyoxyethyl methacrylate (which may be "deprotected" after polymerization to form 2-hydroxyethyl methacrylate), 2,2,2-trifluoroethyl methacrylate, 4-(tetrahydro-2-pyranyloxy)-benzyl methacrylate (which may be deprotected after polymerization to 4-hydroxy-benzyl methacrylate), lauryl methacrylate, ethoxytriethylene glycol methacrylate, butoxyethyl methacrylate, methoxyethoxyethyl methacrylate, sorbyl methacrylate, 2-acetoxyethyl methacrylate, 3-trimethoxysilylpropyl methacrylate, allyl methacrylate, octyl methacrylate, methoxypolyethylene glycol methacrylate, ethoxyethyl methacrylate, 2-tetrahydropyranyl methacrylate (which may be deprotected after polymerization to form methacrylic acid), t-butyl methacrylate (which may be deprotected after polymerization to form methacrylic acid) and 2-dimethylaminoethyl methacrylate.

Each block may contain a small amount of a monomer with a functional group such as carboxylic acid, amine, alcohol or epoxide, for specific chemical bonding at interfaces. (See Example 7 which has 3 COOH functional groups in the B block.)

Preferred triblock polymers include poly(methacrylic acid-b-2-phenylethyl methacrylate-co-2-dimethylaminoethyl methacrylate-b-ethoxytriethylene glycol methacrylate), poly(methoxypolyethylene glycol methacrylate-b-2-phenylethyl methacrylate-b-ethoxytriethylene glycol methacrylate), poly(methacrylic acid-b-methyl methacrylate-b-2-dimethylaminoethyl methacrylate) and poly(2-dimethylaminoethyl methacrylate)-b-2-phenylethyl methacrylate-b-methacrylic acid.

ABC triblock polymers of the present invention are useful for surface modification. ABC triblock polymers of the invention may be designed to be active at air-liquid interfaces, solid-solid interfaces, liquid-liquid, and liquid-solid interfaces. For example, certain triblock polymers are useful for modification of biological surfaces. ABC triblock polymers may also be used for modification of pigment surfaces which can result in stable dispersions. Triblock polymers also provide excellent dispersing agents for pigments in organic media, aqueous media, or mixed aqueous-organic media. Thus, poly(methacrylic acid-b-2-phenylethyl methacrylate-b-ethoxytriethylene glycol methacrylate), after neutralization of the methacrylic acid units with potassium hydroxide, is an excellent dispersant for carbon black in water or in water containing organic cosolvents. The interfacial activity of certain ABC triblock polymers of this invention also enables them to be used as compatibilizers for polymer blends and stabilizers for dispersion of fluids.

EXAMPLES

Example 1

Preparation of poly(methacrylic acid [56mol %]-b-2-phenylethyl methacrylate [22 mol %]-b-n-butyl methacrylate [22 mol %])

A solution of 3.48 g (4.04 mL, 20 mmol) of 1-methoxy-1-trimethylsiloxy-2-methyl-1-propene, 1.0 mL of tetrabutylammonium biacetate hexahydrate (0.04 M in THF), and 0.8 g (1.0 mL, 6 mmol) of bis(dimethylamino)-methylsilane in 250 mL of THF was allowed to stand for 10 min. Then a mixture of 44.5 g (43.6 mL, 261 mmol) of 2-tetrahydropyranyl methacrylate (purified by passage over a column of basic alumina under argon) and 0.8 g (1.0 mL, 6 mmol) of bis(dimethylamino)methylsilane was begun. During the course of the addition the temperature of the reaction mixture rose to 51° C. After all of the mixture had been added, and the temperature began to fall, the addition of a mixture of 19.6 g (19.4 mL, 103 mmol) of 2-phenylethyl methacrylate (purified by passage over a column of basic alumina under argon), and 0.8 g (1.0 mL, 6 mmol) of bis(dimethylamino)methylsilane was begun. During the addition the temperature rose to 56° C. When the addition was complete and the temperature began to fall, a mixture of 14.7 g (16.4 mL, 103 mmol) of n-butyl methacrylate (purified by passage over a column of basic alumina under argon), and 0.8 g (1.0 mL, 6 mmol) of bis(dimethylamino)methylsilane was added dropwise from an addition funnel. During the addition the temperature rose to 57° C. Analysis of an aliquot of the solution by $^1$H nmr showed that there was no residual monomer present. After addition of 15 mL of methanol to quench the reaction, precipitation in methanol followed by drying of the precipitate under reduced pressure gave 42.8 g of poly(tetrahydropyranyl methacrylate [56 mol %]-b- 2-phenylethyl methacrylate [22 mol %]-b-n-butyl methacrylate [22 mol%]). Analysis by gel permeation chromatography (GPC) showed $\overline{M}_n = 4310$, $\overline{M}_w = 4500$, $\overline{M}_w/\overline{M}_n = 1.05$. The polymer was heated in a vacuum oven at 130° C. for 20 hr to decompose the tetrahydropyranyl ester groups, giving 30 g of poly(methacrylic acid [56 mol %]-b-2-phenylethyl methacrylate [22 mol %]-b-n-butyl methacrylate [22 mol%]). Analysis of the product by $^1$H NMR showed that there was no tetrahydropyranyl ester present.

EXAMPLE 2

Preparation of poly(methacrylic acid [56 mol %]-b-n-butyl methacrylate [22 mol %]-b-2-phenylethyl methacrylate [22 mol %])

A solution of 3.53 g (4.1 mL, 20 mmol) of 1-methoxy-1-trimethylsiloxy-2-methyl-1-propene, 1.0 mL of tetrabutylammonium biacetate hexahydrate (0.04 M in THF), and 0.8 g (1.0 mL, 6 mmol) of bis(dimethylamino)-methylsilane in 250 mL of THF was allowed to stand for 10 min. Then a mixture of 44.5 g (43.6 mL, 261 mmol) of 2-tetrahydropyranyl methacrylate (purified by passage over a column of basic alumina under argon) and 0.8 g (1.0 mL, 6 mmol) of bis(dimethylamino)methylsilane was begun. During the course of the addition the temperature of the reaction mixture rose to 50° C. After all of the mixture had been added, and the temperature began to fall, a mixture of 14.7 g (16.4 mL, 103 mmol) of n-butyl methacrylate (purified by passage over a column of basic alumina under argon), and 0.8 g (1.0 mL, 6 mmol) of bis(dimethylamino)-methylsilane was added dropwise from an addition funnel. During the addition the temperature rose from 49° C. to 55° C. When the addition was complete and the temperature began to fall, the addition of a mixture of 19.6 g (19.4 mL, 103 mmol) of 2-phenylethyl methacrylate (purified by passage over a column of basic alumina under argon), and 0.8 g (1.0 mL, 6 mmol) of bis(dimethylamino)methylsilane was begun. During the addition the temperature rose from 54° C. to 57° C. Analysis of an aliquot of the solution by $^1$H nmr showed that there was no residual monomer present. After addition of 15 mL of methanol to quench the reaction, precipitation in methanol followed by drying of the precipitate under reduced pressure gave 41.5 g of poly(tetrahydropyranyl methacrylate [56 mol%]-b-n-butyl methacrylate [22 mol %]-b-2-phenylethyl methacrylate [22 mol %]). Analysis by GPC showed $\overline{M}_n=4600$, $\overline{M}_w=4850$, $\overline{M}_w/\overline{M}_n=1.06$. The polymer was heated in a vacuum oven at 130° C. for 20 hr to decompose the tetrahydropyranyl ester groups, giving 29 g of poly(methacrylic acid [56 mol %]-b-n-butyl methacrylate [22 mol %]-b-2-phenylethyl methacrylate [22 mol %]). Analysis of the product by $^1$H NMR showed that there was no tetrahydropyranyl ester present.

EXAMPLE 3

Preparation of poly(methacrylic acid [57 mol %]-b-2-phenylethyl methacrylate [13 mol %]-b-n-butyl methacrylate [30 mol %])

A solution of 1.95 g (2.26 mL, 11.2 mmol) of 1-methoxy-1-trimethylsiloxy-2-methyl-1-propene, 0.5 mL of tetrabutylammonium biacetate hexahydrate (0.04 M in THF), and 0.8 g (1.0 mL, 6 mmol) of bis(dimethylamino)-methylsilane in 120 mL of THF was allowed to stand for 10 min. Then a mixture of 11.1 g (12.4 mL, 78 mmol) of n-butyl methacrylate (purified by passage over a column of basic alumina under argon), and 0.8 g (1.0 mL, 6 mmol) of bis(dimethylamino)methylsilane was added dropwise from an addition funnel. During the course of the addition the temperature of the reaction mixture rose to 38° C. After all of the mixture had been added, and the temperature began to fall, the addition of a mixture of 6.4 g (6.3 mL, 33 mmol) of 2-phenylethyl methacrylate (purified by passage over a column of basic alumina under argon), and 0.8 g (1.0 mL, 6 mmol) of bis(dimethylamino)methylsilane was begun. During the addition the temperature rose from 36.5° C. to 41° C. When the addition was complete and the temperature began to fall, a mixture of 24.7 g (24.2 mL, 145 mmol) of 2-tetrahydropyranyl methacrylate (purified by passage over a column of basic alumina under argon) and 0.8 g (1.0 mL, 6 mmol) of bis(dimethylamino)methylsilane was begun. During the addition the temperature rose from 40° C. to 59° C. Analysis of an aliquot of the solution by $^1$H nmr showed that there was no residual monomer present. After addition of 15 mL of methanol to quench the reaction, precipitation in methanol followed by drying of the precipitate under reduced pressure gave 34.7 g of poly(tetrahydropyranyl methacrylate [57 mol %]-b-2-phenylethyl methacrylate [13 mol %]-b-n-butyl methacrylate [30 mol%]). The polymer was heated in a vacuum oven at 138° C. for 2.5 days to decompose the tetrahydropyranyl ester groups, giving 23.7 g of poly(methacrylic acid [57 mol%]-b-2-phenylethyl methacrylate [13 mol %]-b-n-butyl methacrylate [30 mol %]). Analysis of the product by $^1$H NMR showed that there was no tetrahydropyranyl ester present.

EXAMPLE 4

Preparation of poly(methacrylic acid [57 mol %]-b-2-phenylethyl methacrylic [26 mol %]-b-ethoxytriethylene glycol methacrylic [17 mol %])

To a solution of 2.96 g (3.43 mL, 17 mmol) of 1-methoxy-1-trimethylsiloxy-2-methyl-1-propene and 0.5 mL of tetrabutylammonium biacetate hexahydrate (0.04 M in THF) in 40 mL of THF was added dropwise 35.0 g (39.7 mL, 261 mmol) of trimethylsilyl methacrylate. During the course of the addition the temperature of the reaction mixture rose slowly to 33° C. To increase the rate of polymerization, an additional 0.5 mL of tetrabutylammonium biacetate hexahydrate (0.04 M in THF) was added. After all of the monomer had been added, the temperature slowly rose to 47° C. during 1 hr. When the temperature began to fall, the addition of 19.4 g (19.2 mL, 102 mmol) of 2-phenylethyl methacrylate (purified by passage over a column of basic alumina under argon) was begun. An additional 0.25 mL of tetrabutylammonium biacetate hexahydrate (0.04 M in THF) was added. During the addition the temperature rose from 42° C. to 44° C. When the addition was complete and the temperature began to fall, 0.25 mL of tetrabutylammonium biacetate hexahydrate (0.04 M in THF) was added, and 16.7 g (16.7 mL, 67.8 mmol) of ethoxytriethylene glycol methacrylate (obtained from Polysciences, Inc., Warrington, Pa.; purified by passage over a column of basic alumina under argon) was added dropwise from an addition funnel. Since little temperature change was observed, an additional 0.25 mL of tetrabutylammonium biacetate hexahydrate (0.04 M in THF) was added to insure completion of the polymerization. Analysis of an aliquot of the solution by $^1$H nmr showed that there was no residual monomer present. To the viscous solution of poly(trimethylsilyl methacrylate [57 mol %]-b-2-phenylethyl methacrylate [26 mol %]-b-ethoxytriethylene glycol methacrylate [17 mol %]) was added 50 mL of THF and 70 mL of a 0.5 volume % solution of dichloroacetic acid in aqueous methanol (prepared from 7.5 mL of dichloroacetic acid, 1030 mL of methanol, and 470 mL of water). The resulting mixture was refluxed for 4 hr and evaporated in a rotary evaporator under reduced pressure. The residual polymer was dried for 48 hr in a vacuum oven at 80° C. to give 46.5 g of poly(methacrylic acid [57 mol %]-b-2-phenylethyl methacrylate [26 mol %]-b-ethoxytriethylene glycol methacrylate [17 mol %]). $^1$H NMR analysis of the product showed that no trimethylsilyl ester groups remained.

EXAMPLE 5

Poly(dimethylaminoethyl methacrylate [30.7 mol %]-co-methyl methacrylate [20.3 mol %]-b-2-phenylethyl methacrylate [32.6 mol %]-b-ethoxytriethylene glycol methacrylate [16.3 mol %])

To a solution of 2.61 g (3.03 mL, 15 mmol) of 1-methoxy-1-trimethylsiloxy-2-methyl-1-propene and 0.2 mL of tetrabutylammonium biacetate hexahydrate (0.04 M in THF) in 120 mL of THF was added dropwise a mixture of 17.7 g (19.0 mL, 113 mmol) of dimethylaminoethyl methacrylate (purified by passage over a column of basic alumina under argon) and 7.5 g (8.0 mL, 74.8 mmol) of methyl methacrylate (purified by passage over a column of basic alumina under argon). During the course of the addition the temperature of the reaction mixture rose from 28° C. to 38° C. After all of the monomer had been added, the temperature began to fall. When the temperature had fallen to 35° C., the addition of 22.8 g (22.6 mL, 120 mmol) of 2-phenylethyl methacrylate (purified by passage over a column of basic alumina under argon) was begun. An additional 0.2 mL of tetrabutylammonium biacetate hexahydrate (0.04 M in THF) was added. During the addition the temperature rose from 35° C. to 40° C. When the addition was complete and the temperature began to fall, 0.2 mL of tetrabutylammonium biacetate hexahydrate (0.04 M in THF) was added, and 14.8 g (60.1 mmol) of ethoxytriethylene glycol methacrylate (purified by passage over a column of basic alumina under argon) was added dropwise from an addition funnel. Analysis of an aliquot of the solution by $^1$H nmr showed that there was no residual monomer present. The solution was evaporated in a rotary evaporator under reduced pressure. The residual polymer was dried for 48 hr in a vacuum oven at 80° C. to give 64 g of poly(dimethylaminoethyl methacrylate [30.7 mol %]-co-methyl methacrylate [20.3 mol %]-b-2-phenylethyl methacrylate [32.6 mol %]-b-ethoxytriethylene glycol methacrylate [16.3 mol %]).

EXAMPLE 6

Preparation of poly(methacrylic acid [25 mol %]-b-2-phenylethyl methacrylate [50 mol %]-b-ethoxytriethylene glycol methacrylate [25 mol %])

To a solution of 3.48 g (4.04 mL, 20 mmol) of 1-methoxy-1-trimethylsiloxy-2-methyl-1-propene and 0.2 mL of tetrabutylammonium biacetate hexahydrate (0.04 M in THF) in 30 mL of THF was added dropwise 15.9 g (18 mL, 100 mmol) of trimethylsilyl methacrylate. During the course of the addition the temperature of the reaction mixture rose slowly while four 0.2 mL portions of tetrabutylammonium biacetate hexahydrate (0.04 M in THF) were added. The temperature continued to rise to 44° C. after all of the monomer had been added. When the temperature began to fall, 50 mL of THF was added, and the addition of 38.1 g (37.7 mL, 200 mmol) of 2-phenylethyl methacrylate (purified by passage over a column of basic alumina under argon) was begun. When the addition was complete and the temperature began to fall, 24.6 g (24.6 mL, 100 mmol) of ethoxytriethylene glycol methacrylate (purified by passage over a column of basic alumina under argon) was added dropwise from an addition funnel. Analysis of an aliquot of the solution by $^1$H nmr showed that there was no residual monomer present. The solution of poly(trimethylsilyl methacrylate [25 mol %]-b-2-phenylethyl methacrylate [50 mol %]-b-ethoxytriethylene glycol methacrylate [25 mol%]) was refluxed for 12 hr with methanolic tetrabutylammonium fluoride. After evaporation in a rotary evaporator under reduced pressure, the residual polymer was dried for 48 hr in a vacuum oven at 80° C. to give 58 g of poly(methacrylic acid [25 mol %]-b 2-phenylethyl methacrylate [50 mol %]-b-ethoxytriethylene glycol methacrylate [25 mol %]). $^1$H NMR analysis of the product showed that no trimethylsilyl ester groups remained.

Additional ABC triblock polymers prepared according to the method of Example 6 include:

Poly-ω-2-β-hydroxyethyl isobutyrate methoxypolyethylene glycol 400 methacrylate [41.7 mol %]-b-2-phenylethyl methacrylate [41.7 mol %]-b-ethoxytriethylene glycol methacrylate [16.6 mol %]). The hydroxyethyl isobutyrate end group was introduced by using the initiator 1-trimethylsiloxy-1-(2-trimethylsiloxyethoxy)-2-methyl-1-propene, followed by deprotection with methanol.

Poly(methacrylic acid [48 mol %]-b-2-phenylethyl methacrylate [37 mol %]-b-2-hydroxyethyl methacrylate [15 mol %]). [The 2-hydroxyethyl methacrylate was polymerized as the protected monomer, 2-trimethylsiloxyethyl methacrylate.]

Poly(methacrylic acid [48 mol %]-b-2-phenylethyl methacrylate [37 mol %]-b-2-ethoxyethyl methacrylate [15 mol %])

Poly(methacrylic acid [41.9 mol %]-b-benzyl methacrylate [22.6 mol %]-co-methyl methacrylate [22.6 mol %]-b-ethoxytriethylene glycol methacrylate [12.9 mol %])

Poly(methacrylic acid [48 mol %]-b-benzyl methacrylate [37 mol %]-b-ethoxytriethylene glycol methacrylate [15 mol %])

Poly(2-dimethylaminoethyl methacrylate [33.3 mol %]-b-2-phenylethylmethacrylate [33.3 mol %]-b-methacrylic acid [33.3 mol%].

EXAMPLE 7

Poly(dimethylaminoethyl methacrylate [30.7 % mol]-co-methyl methacrylate [20.3 mol %]-b-2-phenylethyl methacrylate [20.3 mol %]-co-methacrylic acid [12.3 mol %]-b-ethoxytriethylene glycol methacrylate [16.3 mol %])

To a solution of 2.61 g (3.03 mL, 15 mmol) of 1-methoxy-1-trimethylsiloxy-2-methyl-1-propene and 0.2 mL of tetrabutylammonium biacetate hexahydrate (0.04 M in THF) in 60 mL of THF was added dropwise a mixture of 17.7 g (19.0 mL, 113 mmol) of dimethylaminoethyl methacrylate (purified by passage over a column of basic alumina under argon) and 7.5 g (8.0 mL, 74.8 mmol) of methyl methacrylate (purified by passage over a column of basic alumina under argon). During the course of the addition the temperature of the reaction mixture rose from 28° C. to 37° C. When 0.2 mL of tetrabutylammonium biacetate hexahydrate (0.04 M in THF) was added, the temperature rose to 42° C. After all of the monomer had been added, the temperature began to fall. When the temperature had fallen to 39° C., the addition of a mixture of 14.1 g (14.2 mL, 75 mmol) of 2-phenylethyl methacrylate (purified by passage over a column of basic alumina under argon) and 7.1 g (8.1 mL, 45 mmol) of trimethylsilyl methacrylate was begun. An additional 2 mL of tetrabutylammonium biacetate hexahydrate (0.04 M in THF) was added in 8 portions during the addition. When the addition was complete and the temperature began to fall, 14.8 g (14.8 mL, 60.1 mmol) of ethoxytriethylene glycol methacrylate (purified by passage over a column of basic alumina under argon) was added dropwise from an addition funnel. Since little temperature change was observed, an additional 0.6 mL of tetrabutylammonium biacetate hexahydrate (0.04 M in THF) was added in three portions to insure completion of the polymerization. Analysis of an aliquot of the solution by $^1$H nmr showed that there was no residual monomer present. To the viscous solution of poly(dimethylaminoethyl methacrylate [30.7 mol %]-co-methyl methacrylate [20.3 mol %]-b-2-phenylethyl methacrylate [20.3 mol %]-co-trimethylsilyl methacrylate [12.3 mol %]-b-ethoxytriethylene glycol methacrylate [16.3 mol %]) was added 50 mL of THF and 11 mL of methanol containing 0.02 g (0.05 mmol) of dichloroacetic acid. The resulting mixture was refluxed for 4 hr and evaporated in a rotary evaporator under reduced pressure. The residual polymer was dried for 48 hr in a vacuum oven at 80° C. to give 58 g of poly(dimethylaminoethyl methacrylate [30.7 mol %]-co-methyl methacrylate [20.3 mol %]-b-2-phenylethyl methacrylate [20.3 mol %]-co-methacrylic acid [12.3 mol %]-b-ethoxytriethylene glycol methacrylate [16.3 mol %]). $^1$H NMR analysis of the product showed that no trimethylsilyl ester groups remained.

EXAMPLE 8

Poly(dimethylaminoethyl methacrylate [28.3 mol %]-co-methyl methacrylate [18.8 mol %]-b-2-phenylethyl methacrylate [37.8 mol %]-b-ethoxytriethylene glycol methacrylate [15.1 mol %])

To a solution of 15.7 g (18.2 mL, 90.2 mmol) of 1-methoxy-1-trimethylsiloxy-2-methyl-1-propene and 0.3 mL of tetrabutylammonium biacetate (0.1 M in propylene carbonate) in 400 mL of THF was added dropwise a mixture of 106 g (114 mL, 677 mmol) of dimethylaminoethyl methacrylate (purified by passage over a column of basic alumina under argon) and 45 g (48.1 mL, 450 mmol) of methyl methacrylate (purified by passage over a column of basic alumina under argon). After all of the monomer had been added and the temperature began to fall the addition of 172 g (170 mL, 903 mmol) of 2-phenylethyl methacrylate (purified by passage over a column of basic alumina under argon) was begun. When the addition was complete and the temperature began to fall, 88.7 g (88.7 mL, 360 mmol) of ethoxytriethylene glycol methacrylate (purified by passage over a column of basic alumina under argon) was added dropwise from an addition funnel. Analysis of an aliquot of the solution by $^1$H nmr showed that there was no residual monomer present. The solution was evaporated in vacuo to give 456 g of poly(dimethylaminoethyl methacrylate [28.3 mol %]-co-methyl methacrylate [18.8 mol %]-b-2-phenylethyl methacrylate [37.8 mol %]-b-ethoxytriethyl glycol methacrylate [15.1 mol %]). GPC: $\overline{M}_n=6240$, $\overline{M}_w=7770$, $\overline{M}_w/\overline{M}_n=1.24$.

EXAMPLE 9

Preparation of poly(methacrylic acid [48 mol %]-b-2-phenylethyl methacrylate [37 mol %]-b-ethoxytriethylene glycol methacrylate [15 mol %])

To a solution of 22.6 g (26.2 mL, 130 mmol) of 1-methoxy-1-trimethylsiloxy-2-methyl-1-propene and 0.1 mL of tetrabutylammonium biacetate (0.1 M in propylene carbonate) in 300 mL of THF was added dropwise 268 g (304 mL, 1.69 mole) of trimethylsilyl methacrylate. During the course of the addition the temperature of the reaction mixture rose slowly to 50° C. To increase the rate of polymerization, an additional 1.5 mL of tetrabutylammonium biacetate (0.1 M in propylene carbonate) was added in 7 portions. After all of the monomer had been added, the temperature began to fall, and the solution was cooled with a bath to 30° C. The addition of 248 g (245 mL, 1.3 mole) of 2-phenylethyl methacrylate (purified by passage over a column of basic alumina under argon) was begun. An additional 0.6 mL of tetrabutylammonium biacetate (0.1 M in propylene carbonate) was added. During the addition the temperature rose 48° C. When the addition was complete and the temperature began to fall, the solution was cooled to 31° C., 0.15 mL of tetrabutylammonium biacetate (0.1 M in propylene carbonate) was added, and 128 g (128 mL, 0.52 mole) of ethoxytriethylene glycol methacrylate (purified by passage over a column of basic alumina under argon) was added dropwise from an addition funnel. Since little temperature change was observed, an additional 0.15 mL of tetrabutylammonium biacetate (0.1 M in propylene carbonate) was added to insure completion of the polymerization. Analysis of an aliquot of the solution by $^1$H nmr showed that there was no residual monomer present. To the solution of poly(trimethylsilyl methacrylate [48 mol %]-b-2-phenylethyl methacrylate [37 mol %]-b-ethoxytriethylene glycol methacrylate [15 mol %]) was added 350 mL of 0.03 M tetrabutylammonium fluoride trihydrate in methanol. The resulting mixture was refluxed for 16 hr and evaporated in a rotary evaporator under reduced pressure. The residual polymer was dried for 48 hr in a vacuum oven to give 515 g of poly(methacrylic acid [48 mol %]-b-2-phenylethyl methacrylate [37 mol %]-b-ethoxytriethylene glycol methacrylate [15 mol %]). $^1$NMR analysis of the product showed that no trimethylsilyl ester groups remained.

EXAMPLE 10

Poly(dimethylaminoethyl methacrylate [14.9 mol %]-b-2-phenylethyl methacrylate [37.1 mol %]-b-ethoxytriethylene glycol methacrylate [48 mol %])

To a solution of 1.57 g (1.82 mL, 9.02 mmol) of 1-methoxy-1-trimethylsiloxy-2-methyl-1-propene and 0.2 mL of tetrabutylammonium biacetate (0.1 M in propylene carbonate) in 150 mL of THF was added dropwise 5.7 g (6.1 mL, 36.2 mmol) of dimethylaminoethyl methacrylate (purified by passage over a column of basic alumina under argon). After all of the monomer had been added and the temperature began to fall the addition of 17.2 g (17 mL, 90.25 mmol) of 2-phenylethyl methacrylate (purified by passage over a column of basic alumina under argon) was begun. When the addition was complete and the temperature began to fall, 28.8 g (28.8 mL, 116.9 mmol) of ethoxytriethylene glycol methacrylate (purified by passage over a column of basic alumina under argon) was added dropwise from an addition funnel. Analysis of an aliquot of the solution by $^1$H nmr showed that there was no residual monomer present. The solution was concentrated under reduced pressure to give 54 g of a 70.35% solids solution of poly(dimethylaminoethyl methacrylate [14.9 mol %]-b-2-phenylethyl methacrylate [37.1 mol %]-b-ethoxytriethylene glycol methacrylate [48 mol %]).

EXAMPLE 11

Preparation of Poly ω-2-β-hydroxyethyl isobutyrate (methoxypolyethylene glycol methacrylate 400 [36.3 mol %]-b-2-phenylethyl methacrylate [45.5 mol %]-b-ethoxytriethylene glycol methacrylate [18.2 mol %])

To a solution of 2.4 g (8.69 mmol) of 1-(2-trimethylsiloxyethoxy)-1-trimethylsiloxy-2-methyl-1-propene and 1.8 mL of tetrabutylammonium biacetate (0.1 M in propylene carbonate) in 50 mL THF was added dropwise 31.99 g (68.35 mmol) of methoxypolyethylene glycol 400 methacrylate (obtained from Polysciences, Inc., Warrington, Pa.; stored over 4 Å sieves for 7 days). During the course of the addition the temperature rose to 40.8° C. When the temperature returned to 27.1° C., the addition of 19.13 g (86.17 mmol) 2-phenylethyl methacrylate (purified by passage over a column of basic alumina) was started. During the course of the addition, the temperature rose to 59.9° C. When the temperature returned to 31.9° C., the addition of 8.59 g (34.36 mmol) ethoxytriethylene glycol methacrylate (stored over 4 Å sieves for 7 days) was started. During the course of the addition, the temperature rose to 41.9° C. Analysis of an aliquot of the solution by 1H NMR showed that there was no residual monomer present.

The poly ω-2-β-hydroxyethyl isobutyrate-(methoxypolyethylene glycol methacrylate 400 [36.3 mol %]-b-2-phenylethyl methacrylate [45.5 mol %]-b-ethoxytriethylene glycol methacrylate [18.2 mol %]) was isolated via precipitation from hexane, then dried 72 hours in a vacuum oven at 50° C. to give 37.74 g of product.

EXAMPLE 12

Poly(methacrylic acid [48 mol %]-b-2-phenylethyl methacrylate [30 mol %]-co-2-dimethylaminoethyl methacrylate [7 mol %]-b-ethoxytriethylene glycol methacrylate [15 mol %])

To a solution of 2.52 g (2.93 mL, 14.5 mmol) of 1-methoxy-1-trimethylsiloxy-2-methyl-1-propene and 0.5 mL of tetrabutylammonium biacetate (0.1 M in propylene carbonate) in 40 mL of THF was added dropwise 29.8 g (33.7 mL, 189 mmol) of trimethylsilyl methacrylate (purified by passage over a column of basic alumina under argon). During the course of the addition the temperature of the reaction mixture rose from 26° C. to 32° C. When 0.5 mL of additional catalyst solution was added, the temperature rose to 50° C. When the temperature had fallen to 36° C., the addition of a mixture of 22.0 g (21.8 mL, 116 mmol) of 2-phenylethyl methacrylate (purified by passage over a column of basic alumina under argon) and 4.6 g (4.9 mL, 29 mmol) of 2-dimethylaminoethyl methacrylate (purified by distillation) was begun. An additional 0.5 mL of catalyst solution was added, and the temperature slowly rose from 34° C. to 36° C. During 30 min, the temperature fell to 30° C. Then 14.5 g (14.5 mL, 58.2 mmol) of ethoxytriethylene glycol methacrylate (purified by passage over a column of basic alumina under argon) was added dropwise from an addition funnel. An additional 0.5 mL of catalyst solution was added, and during 40 min, the temperature rose to 32° C. and then fell to room temperature. Analysis of an aliquot of the solution by $^1$H nmr showed that there was no residual monomer present. The solution of poly(trimethylsilyl methacrylate [48 mol %]-b-2-phenylethyl methacrylate [30 mol %]-co-2-dimethylaminoethyl methacrylate [7 mol %]-b-ethoxytriethylene glycol methacrylate [15 mol %]) was treated with 45 mL of 0.03 M methanolic tetrabutylammonium fluoride and heated at reflux for 8 hr. The solution was evaporated in a rotary evaporator under reduced pressure. The residual polymer was dried for 24 hr in a vacuum oven to give 59 g of poly(methacrylic acid [48 mol %]-b-2-phenylethyl methacrylate [30 mol %]-co-2-dimethylaminoethyl methacrylate [7 mol %]-b-ethoxytriethylene glycol methacrylate [15 mol% ]). $^1$H NMR analysis of the product showed that no trimethylsilyl ester groups remained.

EXAMPLE 13

Preparation of pigment dispersion using poly(dimethylaminoethyl methacrylate [28.3 mol %]-co-methyl methacrylate [18.8 mol %]-b-2-phenylethyl methacrylate [37.8 mol %]-b-ethoxytriethylene glycol methacrylate [15.1 mol %])

A black pigment dispersion was prepaerd using the following procedure:

| Ingredient | Amount (parts by weight) |
|---|---|
| FW18, Carbon black pigment (Degussa Corp., Allendale, NJ 07041) | 40.0 |
| Polymer obtained in Example 8, (15% solution, neutralized with phosphoric acid) | 133.3 |
| Deionized water | 226.7 |
| Total | 400.0 |

The above mentioned components were premixed in a plastic beaker by mechanical stirring until no lumps or dry clumps were visible. The mixture was dispersed in a microfluidizer (Microfluidics Corp., Watham, Mass.) by passing it through the interaction chamber 5 times under a liquid pressure of about 10,000 psi. The resulting pigment dispersion had 10% pigment concentration with an average particle size of 117 nm as determined by Brookhaven BI-90 particle sizer. The final pH was 4.0.

EXAMPLE 14

Preparation of pigment dispersion using poly(methacrylic acid [48 mol %]-b-2-phenylethyl methacrylate [37 mol %]-b-ethoxytriethylene glycol methacrylate [15 mol %])

A black dispersion was prepared using the following procedure:

| Ingredient | Amount (parts by weight) |
|---|---|
| FW18, Carbon black pigment (Degussa Corp., Allendale, NJ 07041) | 200 |
| Polymer obtained in Example 9, (10% solution, 10% solution, 80% neutralized with KOH) | 1,000 |
| Deionized water | 800 |
| Total | 2,000 |

The above mentioned components were premixed and dispersed as described in Example 11 to give a 10% pigment concentrate, having an average particle size of 114 nm as determined by Brookhaven BI-90 particle sizer. The final pH was 7.57.

As many different embodiments of this invention may be made without departing from the spirit and scope thereof, it is to be understood that this invention is not limited to the specific embodiments disclosed, except as defined by the appended claims.

What is claimed is:

1. A linear methacrylic ABC triblock polymer in which the composition of each of the three blocks is different, having at least one hydrophilic block and at least one hydrophobic block.

2. The methacrylic ABC triblock polymer of claim 1 wherein the "B" block does not contain a significant amount of the components of the "A" and "C" blocks.

3. The methacrylic ABC triblock polymer of claim 2 wherein two or all three of the blocks are mutually immiscible.

4. The methacrylic ABC triblock polymer of claim 1 or claim 2 wherein the A and C blocks are hydrophilic and the B block is hydrophobic or the B block is hydrophilic and the A and C blocks are hydrophobic.

5. The methacrylic ABC triblock polymer of claim 1 or claim 2 wherein the A and C blocks differ in stiffness from the B block.

6. The methacrylic ABC triblock polymer of claim 1 or claim 2 wherein the A and C blocks differ in glass transition temperature from the B block.

7. The methacrylic ABC triblock polymer of claim 1 or claim 2 wherein the A and C blocks differ in polarity from the B block.

8. The methacrylic ABC triblock polymer of claim 1 wherein each of the blocks comprises a methacrylic homopolymer, or its salt, or a linear methacrylic random copolymer, or its salt.

9. The ABC triblock polymer of claim 1 or claim 2 wherein the monomers used to construct the triblock polymer are each selected from methyl methacrylate, ethyl methacrylate, 2-ethylhexyl methacrylate, isobornyl methacrylate, benzyl methacrylate, 1-ethoxy-1-propyl methacrylate, glycidyl methacrylate, 2-trimethylsilyoxyethyl methacrylate, 2,2,2-trifluoroethyl methacrylate, 4-(tetrahydro-2-pyranyloxy)benzyl methacrylate, lauryl methacrylate, ethoxytriethylene glycol methacrylate, butoxyethyl methacrylate, methoxyethoxyethyl methacrylate, sorbyl methacrylate, 2-acetoxyethyl methacrylate, 3-trimethoxysilylpropyl methacrylate, allyl methacrylate, octyl methacrylate, methoxypolyethylene glycol methacrylate, ethoxyethyl methacrylate, tetrahydropyranyl methacrylate, t-butyl methacrylate and 2-dimethylaminoethyl methacrylate.

10. An ABC triblock polymer of claim 1 or claim 2 comprising poly(methacrylic acid-b-2-phenylethyl methacrylate-co-2-dimethylaminoethyl methacrylate-b-ethoxytriethylene glycol methacrylate).

11. An ABC triblock polymer of claim 1 or claim 2 comprising poly(methoxypolyethylene glycol methacrylate-b-2-phenylethyl methacrylate-b-ethoxytriethylene glycol methacrylate).

12. An ABC triblock polymer of claim 1 or claim 2 selected from poly(methacrylic acid-b-2-phenylethyl methacrylate-b-n-butyl methacrylate), poly(methacrylic acid-b-2-phenylethyl methacrylate-b-ethoxytriethylene glycol methacrylate), poly(methacrylic acid-b-2-phenylethyl methacrylate-b-methoxypolyethylene glycol methacrylate) and poly(methacrylic acid-co-methyl methacrylate-b-2-phenylethyl methacrylate-b-ethoxytriethylene glycol methacrylate), poly-$\omega$-2-$\beta$-hydroxyethyl isobutyrate(methoxypolyethylene glycol 400 methacrylate)-b-2-phenylethyl methacrylate-b-ethoxytriethylene glycol methacrylate), poly(methacrylic acid-b-2-phenylethyl methacrylate-b-2-hydroxyethyl methacrylate), poly(methacrylic acid-b-2-phenylethyl methacrylate-b-2-ethoxyethyl methacrylate), poly(methacrylic acid-b-benzyl methacrylate-co-methyl methacrylate-b-ethoxytriethylene glycol methacrylate), and poly(methacrylic acid-b-benzyl methacrylate-b-ethoxytriethylene glycol methacrylate).

13. An alkali metal salt of the triblock polymer of claim 12.

14. An ABC triblock polymer of claim 1 or claim 2 selected from poly(2-dimethylaminoethyl methacrylate-co-methyl methacrylate-b-2-phenylethyl methacrylate-b-ethoxytriethylene glycol methacrylate), poly(2-dimethyl-aminoethyl methacrylate-co-methyl methacrylate-b-2-phenylethyl methacrylate-co-methacrylic acid-b-ethoxytriethylene glycol methacrylate) and poly(2-dimethylaminoethyl methacrylate-b-2-phenylethyl methacrylate-b-ethoxytriethylene glycol methacrylate).

15. A mineral acid salt of the triblock polymer of claim 14.

16. An ABC triblock polymer of claim 1 or claim 2 selected from poly(methacrylic acid-b-methyl methacrylate-b-2-dimethylaminoethyl methacrylate) and poly(2-dimethylaminoethyl methacrylate)-b-2-phenylethyl methacrylate]-b-methacrylic acid.

17. the alkali metal salt of the triblock polymer of claim 16.

18. The mineral acid salt of the triblock polymer of claim 16.

19. The alkali metal salt of the triblock polymer of claim 10.

* * * * *